United States Patent
Greene et al.

(10) Patent No.: US 10,554,924 B2
(45) Date of Patent: *Feb. 4, 2020

(54) DISPLAYING CONTENT BETWEEN LOOPS OF A LOOPING MEDIA ITEM

(71) Applicant: Google LLC, Mountain View, CA (US)

(72) Inventors: Kevin Greene, San Francisco, CA (US); Tim Johnson, San Francisco, CA (US)

(73) Assignee: Google LLC, Mountain View, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/823,483

(22) Filed: Nov. 27, 2017

(65) Prior Publication Data

US 2018/0084218 A1 Mar. 22, 2018

Related U.S. Application Data

(63) Continuation of application No. 14/253,794, filed on Apr. 15, 2014, now Pat. No. 9,832,418.

(51) Int. Cl.
| | |
|---|---|
| *H04N 5/765* | (2006.01) |
| *H04N 21/2743* | (2011.01) |
| *H04N 21/4788* | (2011.01) |
| *H04N 21/81* | (2011.01) |
| *H04N 21/858* | (2011.01) |
| *H04N 5/91* | (2006.01) |
| *H04N 21/262* | (2011.01) |

(Continued)

(52) U.S. Cl.
CPC ............... *H04N 5/765* (2013.01); *H04N 5/91* (2013.01); *H04N 21/262* (2013.01); *H04N 21/2668* (2013.01); *H04N 21/2743* (2013.01); *H04N 21/4331* (2013.01); *H04N 21/4788* (2013.01); *H04N 21/8133* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 6,047,317 A | 4/2000 | Bisdikian et al. | |
| 6,124,854 A | 9/2000 | Sartain et al. | |

(Continued)

FOREIGN PATENT DOCUMENTS

| | | |
|---|---|---|
| CN | 101969546 | 2/2011 |
| CN | 102695093 | 9/2012 |

(Continued)

OTHER PUBLICATIONS

Extended European Search Report for E.P. Application No. 15779446.2-1905 | 3132416 dated Nov. 2, 2017 10 pages.

(Continued)

*Primary Examiner* — Heather R Jones
(74) *Attorney, Agent, or Firm* — Lowenstein Sandler LLP

(57) ABSTRACT

A method for displaying content between loops of a looping media item is provided herein. The method includes receiving a request for a primary media item and determining that the requested primary media item is a looping media item. The method further includes identifying a secondary media item for the primary media item, and providing the primary media item and the secondary media item for presentation between loops of the primary media item.

25 Claims, 8 Drawing Sheets

(51) Int. Cl.
*H04N 21/2668* (2011.01)
*H04N 21/433* (2011.01)

(56) References Cited

U.S. PATENT DOCUMENTS

| | | | |
|---|---|---|---|
| 7,082,437 | B2 | 7/2006 | Reed et al. |
| 7,886,068 | B1 | 2/2011 | Rao et al. |
| 8,468,562 | B2 | 6/2013 | Miller et al. |
| 9,055,343 | B1 | 6/2015 | Lewis et al. |
| 9,064,010 | B2 | 6/2015 | Maharajh et al. |
| 2003/0120541 | A1 | 6/2003 | Siann et al. |
| 2005/0066279 | A1 | 3/2005 | LeBarton et al. |
| 2006/0136967 | A1 | 6/2006 | Hellman |
| 2006/0156238 | A1* | 7/2006 | Lee ............... G11B 27/034 715/723 |
| 2006/0156243 | A1* | 7/2006 | Lee ............... G06F 21/10 715/741 |
| 2010/0037138 | A1 | 2/2010 | Shcherbakov et al. |
| 2010/0070901 | A1 | 3/2010 | Skinner et al. |
| 2010/0180029 | A1 | 7/2010 | Fourman |
| 2011/0078728 | A1* | 3/2011 | Fu ............... G06Q 30/02 725/35 |
| 2011/0126236 | A1 | 5/2011 | Arrasvuori et al. |
| 2011/0225496 | A1 | 9/2011 | Jeffe et al. |
| 2012/0198492 | A1 | 8/2012 | Dhruv et al. |
| 2012/0210374 | A1 | 8/2012 | Dasher et al. |
| 2013/0219427 | A1 | 8/2013 | Zundel et al. |
| 2013/0227350 | A1 | 8/2013 | O'Riordan et al. |
| 2014/0223307 | A1* | 8/2014 | McIntosh ............ G11B 27/105 715/719 |
| 2014/0372893 | A1 | 12/2014 | Yamat et al. |
| 2015/0113400 | A1 | 4/2015 | Andrianakou et al. |
| 2015/0288742 | A1* | 10/2015 | Flynn ............... H04L 67/10 709/217 |
| 2015/0296195 | A1 | 10/2015 | Greene et al. |

FOREIGN PATENT DOCUMENTS

| | | |
|---|---|---|
| KR | 10-2008-0092179 | 10/2008 |
| WO | 0072592 | 11/2000 |
| WO | 2007005661 | 11/2001 |
| WO | 2004080054 A2 | 9/2004 |
| WO | 2004080054 A3 | 9/2004 |

OTHER PUBLICATIONS

Chinese Office Action for Chinese Application No. 201580019651.8, dated Oct. 15, 2018, 17 pages.

Chinese Office Action for Chinese Application No. 201480058719.9, dated Jun. 20, 2018, 19 pages.

"You Tube Auto Replay: Add-ons for Firefox—Add-Ons—YouTube Auto Replay 1.9.2" Website address: https://addons.mozilla.org/el1-U S/firefox/addon/youtube-auto-replay/ ( 4 pages).

"Vimeo FAO—Help Center/FAO," Website address: htlp;//vimeo.com/help.tfaq (79 pages).

International Searching Authority, "Notification of Transmittal of the International Search Report and the Written Opinion of the International Search Authority, or the Declaration," for International Application No. PCT/US2014/061395, dated Feb. 5, 2015, 12 pages.

Loopy for YouTube for Greasemonkey—Userscripts.org, Website address: http://userscripts.org/scripts/show/28832 Oct. 4, 2008 (4 pages).

International Searching Authority, "Notification of Transmittal of the International Search Report and the Written Opinion of the International Search Authority, or the Declaration," for International Application No. PCT/US2015/025104, dated Jun. 30, 2015, 14 pages.

"Apple QuickTime Discussion Thread, How do I save a quicktime video with a loop for a kiosk?,https://discussions.apple.com/thread/4940105?tstart=0, Apr. 2013, 5 pgs."

"StackOverflow.com/Play infinitely looping video on-load in HTML5, https://stackoverflow.com/questions/10377453/play-infinitely-looping-video-on-load-in-html5, Apr. 2012, 2 pgs."

"JavaFX for Swing Developers Internet Archive May 23, 2012https://web.archive.org/web/20120523204531/http://docs.oracle.com/javafx/2/swing/media -player.htm, ""Building the Media Player Application,""1 pg."

HTML5 Canvas, 2nd Edition, by: Steve Fulton; Jeff Fulton, Publisher: O'Reilly Media, Inc., Pub. Date: Apr. 25, 2013, Print ISBN-13: 978-1-4493-3498-7, http://techbus.safaribooksonline.com/book/web-development/html/9781449335847, "Video with Control, Loop and Autoplay," 1 pg.

* cited by examiner

Receive a request for a primary media item
402
Determine that the requested primary media item is a looping media item
404
Identify a secondary media item for the primary media item
406
Provide the primary media item and the secondary media item for presentation between loops of the primary media item
408
FIG. 4

500

Receive a secondary item for insertion into a looping media item with one or more primary media items
502

Receive information identifying the one or more primary media items
504

Associate the secondary media item with the information identifying the one or more primary media items
506

Provide the secondary media item for play with at least one of the primary media items
508

```
Provide a user interface for selection of at least one primary media item from a plurality of primary
media items
                                                                                                    602
                                    ↓
Display a thumbnail of each of the plurality of primary media items                                 604
                                    ↓
Receive a user selection of the at least one primary media item                                     606
                                    ↓
Store a link to the at least one primary media item with a link to the secondary media item        608
```

```
Provide a user interface for selection of at least one primary media item from a plurality of primary
media items
                                                                                                    612
                                    ↓
Display a plurality of tags for a plurality of primary media items                                  614
                                    ↓
Receive a user selection of one tag of the plurality of tags                                        616
                                    ↓
Store a link to the secondary media item with links to primary media items corresponding to the tag
                                                                                                    618
```

FIG. 6B

700
Receive a request for a primary media item
702
Receive instructions to loop the primary media item and to present a secondary media item in between loops of the primary media item
704
Play the primary media item
706
When playing the primary media item is completed, present the secondary media item followed by another playing of the primary media item
708
FIG. 7

DISPLAYING CONTENT BETWEEN LOOPS OF A LOOPING MEDIA ITEM

RELATED APPLICATIONS

This application is a continuation of co-pending U.S. patent application Ser. No. 14/253,794, filed Apr. 15, 2014, entitled, "DISPLAYING CONTENT BETWEEN LOOPS OF A LOOPING MEDIA ITEM," which is incorporated herein by reference.

TECHNICAL FIELD

This disclosure relates to the field of content-sharing platforms and, in particular, to displaying content between loops of a looping media item.

BACKGROUND

On the Internet, content-sharing platforms, like social networks and others, allow users to connect to and share information with each other. Many social networks include a content-sharing aspect that allows users to upload, view, and share content, such as video content, image content, audio content, and so on (which may be collectively referred to as "media items" or "content items"). Such media items may include professionally produced audio clips, movie clips, TV clips, and music videos, as well as amateur content such as video blogging, short original videos, pictures, photos, audio recordings, other multimedia content, etc. Users may use computing devices (such as smartphones, cellular phones, laptop computers, desktop computers, netbooks, and tablet computers) to access the content-sharing platforms to use, play, and/or consume media items (e.g., watch digital videos, and/or listen to digital music).

In some content-sharing platforms, a media item may be displayed in a continuous loop, such that immediately after the media item is displayed in its entirety to a user of the platform, the media item is displayed to the user again. Such media items may often be of a shorter duration, such as under a minute in play time. This unique form of media item, the looping media item, may present unique opportunities and challenges.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one implementation, a method for displaying content between loops of a looping media item is disclosed. The method includes receiving a request for a primary media item and determining that the requested primary media item is a looping media item. The method further includes steps of identifying, by a processing device, a secondary media item for the primary media item and of providing the primary media item and the secondary media item for presentation between loops of the primary media item.

In one implementation, a system for displaying content in between loops of a looping media item is provided. The system includes a memory to store instructions and a processing device communicably coupled to the memory. The processing device executes the instructions to receive a secondary item for insertion into a looping media item with one or more primary media items and to receive information identifying the one or more primary media items. The processing device further associates the secondary media item with the information identifying the one or more primary media items and provides the secondary media item for play with at least one of the primary media items.

In another implementation, another method for displaying content between loops of a looping media item is provided. The method includes receiving a request for a primary media item and receiving instructions to loop the primary media item and to present a secondary media item in between loops of the primary media item. The method also includes playing the primary media item and, when playing the primary media item is completed, presenting the secondary media item followed by another playing of the primary media item.

In additional embodiments, computing devices for performing the operations of the above described embodiments are also disclosed. Additionally, in embodiments of the disclosure, a computer-readable storage media stores methods for performing the operations of the above described embodiments.

BRIEF DESCRIPTION OF THE DRAWINGS

The present disclosure is illustrated by way of example, and not by way of limitation, in the figures of the accompanying drawings.

FIG. 4 is a flow diagram illustrating a method displaying a secondary media item with a looping primary media item, according to some embodiments of the disclosure.

FIG. 5 is a flow diagram illustrating a method for displaying content in between loops of a looping media item, according to some embodiments of the disclosure.

FIGS. 6A and 6B are flow diagrams illustrating methods of identifying a secondary media item to play in connection with a primary media item, according to some embodiments of the disclosure.

FIG. 7 is a flow diagram illustrating another method for displaying content in between loops of a looping media item, according to some embodiments of the disclosure.

Figure 1:
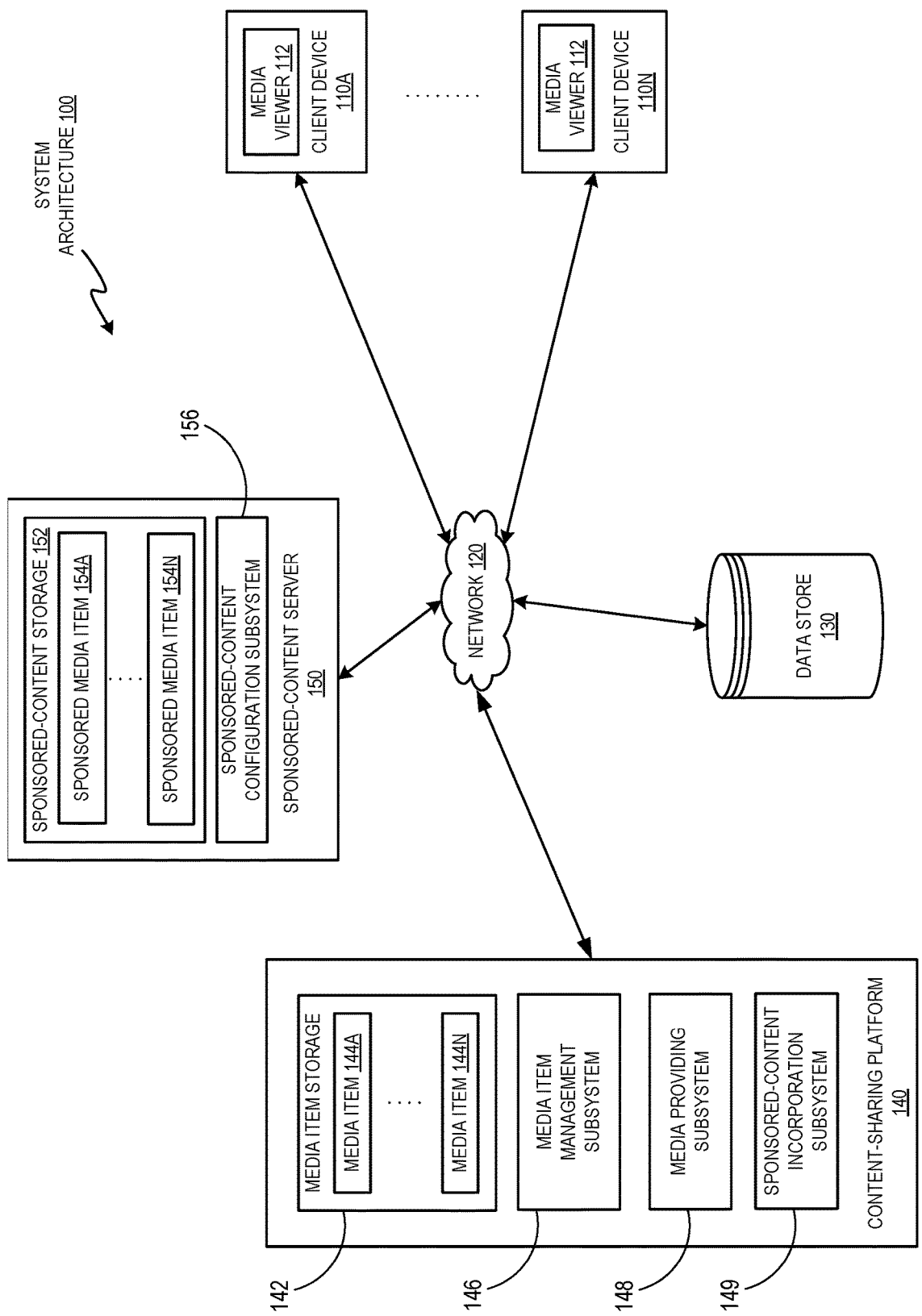
FIG. 1 illustrates an exemplary system architecture, in accordance with an embodiment of the disclosure.

These drawing may be better understood when observed in connection with the following Detailed Description.

DETAILED DESCRIPTION

Implementations are described for displaying content between loops of a looping media item. In recent years, the creation and sharing of media items, such as videos, that are presented or displayed in a continuous loop has increasing in popularity. A looping media item refers to a media item that is intended (e.g., by a media item creator or owner) to be played repeatedly on a viewer screen without a viewer request for such repetition. These looping media items, e.g.

a looping video, may be created by a user of a content-sharing platform and shared with all or with a limited number of viewers that may also be users of that same content-sharing platform. Typically, looping media items may be less than a minute, e.g. 15 seconds, 10 second, or less. However, this is not always the case. Longer media items may be converted to looping media items as well. Of note, the unique format of looping media items may present difficulties in the monetization of such content.

Implementations of the present disclosure enable a primary media item, intended for distribution and viewing as a looping media item, to be presented or displayed in connection with a secondary media item in between loops. By presenting the secondary media item, whether text, a still image, another video, or some combination thereof, for display in between loops of the primary media item, the primary media item can be monetized (e.g., presented along with one or more advertisements) to provide revenue to its creators and/or to the content-sharing platform that hosts it. Additionally, the inclusion of additional content, including user-generated content, into a looping media item may present new opportunities to increase engagement with the original primary media item and in the community of users.

Frequently in this disclosure, examples directed to looping videos are used. This is done for ease of explanation. However, embodiments with primary content other than looping videos are also well within the scope of this disclosure, regardless of where specific examples of such are provided herein.

Thus, in some embodiments the primary media items are videos uploaded as looping media items by users of a content-sharing platform. The primary media items may be converted into looping media items as part of being uploaded to a content-sharing platform that provides for the display and sharing of looping media content or into a content-sharing platform that accepts non-looping media items. In the latter, an indication may be provided at the time of uploading that the primary media item is to be presented to other users of the content-sharing platform as a looping media item. A secondary media item can then be associated, by another user or by the original user that uploaded the primary media item or by the content-sharing platform, with one or more primary media items, such that secondary media item and the primary media item are played as a combined looping media item (e.g., if the owner or creator of the primary media item allows for such a combination).

In some embodiments, a sponsored-content provider or content sponsor, such as a company or advertiser, may use an interface to request that a secondary media item be displayed to users of the content-sharing platform when those users request the primary media items. In making that request, the sponsored-content provider may specify a number of times the associated primary media item should loop before the secondary media item is displayed. In some embodiments, the secondary media item may have a longer duration than the primary media item. In such embodiments, or in others, the sponsored-content provider may request that the secondary media item be split into two or more portions. Then, for example, after several loops of the primary media item, a first portion of the secondary media item is played. After several more loops of the primary media item, a second portion of the secondary media item is played, etc. This may be done to prevent the association of the secondary media item with the primary media item from imposing excessively on users of the content-sharing platform, degrading their experiences on the content-sharing platform. Rather than directly selecting one or more individual primary media items, a sponsored-content provider may use one or more media item characteristics such as content tags that are used to describe one or more primary media items. For example, a "coffee" tag may be associated with a primary media item, either through user-based tagging or through machine tagging (e.g., if the content of the primary media item is related to coffee). A coffee company may select the tag "coffee" in a request to have an advertisement displayed with one or more user generated videos that are tagged with "coffee." This may simplify the selection process for the sponsored-content provider and enable the sponsored-content provider to reach a wider audience.

In some embodiments, a secondary media item may be supplied by other users of the content-sharing platform, e.g. users that do not financially sponsor content or that do not sponsor the content of the secondary media item. For example, the content-sharing platform may provide a user interface to facilitate users in commenting on primary media items presented on the platform or may provide for the upload of a media item that is responsive to the primary media item, e.g. a "reply" video. Thus, the secondary media item may be a comment on the primary media item. This comment may be displayed in a frame in the user interface that is also used to display the primary media item to users.

When a secondary media item is associated with a primary media item, a link to the secondary media item may be stored in a database in association with a link to the primary media item. Alternatively, the association between the primary media item and the secondary media item may occur dynamically when the primary media item is requested for presentation to a viewer (e.g., if a sponsor of the secondary media item requested that the secondary media item be presented with any primary media item that has certain characteristics). When the primary media item is requested by a user of the content-sharing platform, the link to the primary media item may be sent along with a link to the secondary media item. The links may be sent together with looping instructions (e.g., in a manifest file). These looping instructions may cause the user's device to play the primary media item a certain number of times before playing the secondary media item, and to play the primary media item again that certain number of times after playing the secondary media item. In some embodiments, the primary media item and/or the secondary media item may be stored in cache so that the media items or item may be played in the absence of network access. The instructions may thereby provide for looping behavior that plays both the primary media item and the second media item as a combined looping media item to the user in a continuous loop.

Thus, embodiments of the present disclosure may provide for the inclusion of sponsored content in looping media items, thereby generating a source of revenue for the users of the content-sharing platform and/or the content-sharing platform itself. Additionally, embodiments of the present disclosure may facilitate engagement among the community of users of the content-sharing platform by including secondary user-generated content in the display of the primary user-generated content.

FIG. 1 illustrates an exemplary system architecture 100, in accordance with an embodiment of the disclosure, for displaying content in between loops of a looping media item. The system architecture 100 includes a plurality of client devices 110A through 110N, a network 120, a data store 130, and a content-sharing platform 140. In one embodiment, network 120 may include a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In one embodiment, the data store 130 may include a memory (e.g., random access memory), a cache, a drive (e.g., a hard drive), a flash drive, a database system, a storage area network (SAN), or another type of component or device capable of storing data. Thus, the data store 130 may also include multiple storage components (e.g., multiple drives or multiple databases) that may also span multiple computing devices (e.g., multiple server computers).

The client devices 110A-N may each include computing devices such as personal computers (PCs), laptops, mobile phones, smartphones, tablet computers, wearable computing devices, etc. Client devices 110A-N may be used to consume and upload content to the content-sharing platform 140. In some embodiments, client device 110A-N may also be referred to as "user devices." Each client device includes a media viewer 112. In one embodiment, the media viewers 112 may be applications that allow users to receive visible content, such as images, videos, web pages, documents, etc., and audio content such as live audio and sound recordings. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) to a user. The media viewer 112 may also display an embedded media player (e.g., a Flash® player or an HTML5 player) that is embedded in a web page (e.g., a web page that may provide information about a product sold by an online merchant, a content-sharing platform such as a social network). In another example, the media viewer 112 may be a standalone application, such as smartphone application, that allows users to view digital media items (e.g., digital videos, digital images, electronic books, shared text, etc.) as part of a content-sharing platform.

The media viewers 112 may be provided to the client devices 110A-N by the content-sharing platform 140, a sponsored-content server 150, and/or a third-party distribution platform. For example, the media viewers 112 may be embedded media players that are embedded in web pages provided by the content-sharing platform 140. In another example, the media viewers 112 may be applications that are downloaded from a server accessible to the client devices 110A-N through the network 120.

In general, functions described in one embodiment as being performed by the content-sharing platform 140 can also be performed on the client devices 110A-N in other embodiments if appropriate. In addition, the functionality attributed to a particular component can be performed by different or multiple components operating together. The content-sharing platform 140 can also be accessed as a service provided to other systems or devices through appropriate application programming interfaces, and thus is not limited to use in websites.

The system architecture 100 of FIG. 1 also includes a sponsored-content server 150. The sponsored-content server 150 may be an advertisement server by which advertisers can provide advertisements for display in connection with media items accessible to the users of the content-sharing platform 140. While illustrated as separate from the content-sharing platform 140, the sponsored-content server 150 may be included as a subsystem of the content-sharing platform 140 and both may be operated by the same entity. Thus, in some embodiments features described herein in connection with the sponsored-content server 150 may be features of the content-sharing platform 140.

In one embodiment, the content-sharing platform 140 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 140 may allow a user to consume, upload, search for, approve of ("like"), dislike, share, and/or comment on media items. The content-sharing platform 140 may also include a website (e.g., a webpage) and/or a smartphone application that may be used to provide a user with access to the media items.

The content-sharing platform 140 includes a media item storage 142 that includes a plurality of media items 144A through N. Examples of media items 144A-N can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. Of note, the media items 144A-N include one or more looping media items, e.g. media items to be played in a continuous loop such that once a media item is played to its end, the media item is automatically played again from the beginning.

A media item may be consumed (e.g., viewed and/or heard) via the Internet and/or via a mobile device application. As used herein, "media," "media item," "online media item," "digital media," "digital media item," "content," and "content item" can include an electronic file that can be executed or loaded using software, firmware or hardware configured to present the digital media item to an entity.

In some embodiments, the content-sharing platform 140 may store the media items 144A-N using the data store 130. The media items 144A-N may be retrieved from data store 130 prior to delivery to one or more of clients 110A-N over network 120. In some embodiments, when a user requests one of media items 144A-N using the client device 110A, the content-sharing platform 140 sends a file, such as a manifest file, that includes a link to the media item where it is hosted, e.g. the data store 130. The client device 110A reads the file received from the content-sharing platform 140 and then requests data comprising the media item from the data store 130 using the link provided in the file. The media item may be streamed or downloaded to the client device 110A. Thereafter, the media item may be presented to a user of the client 110A through the media viewer 112 operating thereon. In some embodiments, the media item may be stored in a local cache on the client 110A, such that it may be displayed repeatedly without being streamed or downloaded repeatedly.

A media item management subsystem 146 may also operate as part of the content-sharing platform 140. The media item management subsystem 146 may maintain information regarding a plurality of users of the content-sharing platform 140. The subsystem 146 may also provide for the uploading of media items to the content-sharing platform 140. As part of the upload process, the media item management subsystem 146 may receive user input describing the media items being uploaded (e.g., their characteristics). For example, the user may be presented with a plurality of existing tags or a field for the entry of a new tag to use to describe an uploaded media item in brief terms or a single term. In such an example, a user uploading a video depicting a snowboarding trick may tag the video with a "snowboarding" tag or with other tags. These tags may facilitate the discovery of the uploaded media item by other users of the content-sharing platform 140, who may be able to search by tag or may have other content associated with a tag displayed as a suggestion upon viewing a media item that was tagged with the particular tag. In some embodiments, the tagging may be performed by artificial intelligence provided in the media item management subsystem 146. The system 146 may be configured to scan uploaded media items to identify people, objects, activities, etc., depicted in the content and tag the media items accordingly for discovery, categorization, and to provide suggested content.

The content-sharing platform 140 further includes a media providing subsystem 148 and a sponsored-content incorporation subsystem 149. These subsystems 148 and 149 may be included as components of the media item management subsystem 146 in some embodiments. The media providing subsystem 148 may facilitate the downloading or streaming of media items 144A-N by providing the content to users of client devices 110A-N or by providing links or files containing links to the media items 144A-N. In such embodiments, the media providing subsystem 148 may return a manifest file to a client device 110A in response to a request for the media item 144A. The manifest file may include one or more links to the media item 144A or versions of the media item 144A, such as different bit-rate versions. The file sent by the media providing subsystem 148 may include instructions for the rendering and playing of the media item 144A in the media view 112 on the client device 110A. For example, where the media item 144A is a looping media item, the file may include instructions to the client device 110A to cause the media item to be played in a loop. The media item 144A item may be stored in a cache of the client device 110A, such that it may be played on the device again without further network access. In this way a continuous stream of data may not be required in order to present the media item 144A as a looping media item to the user of the client device 110A.

The sponsored-content incorporation subsystem 149 may facilitate cooperation between the content-sharing platform 140 and the sponsored-content server 150. As described above, the sponsored-content server 150 may be an advertisement server. The sponsored content server 150 includes a sponsored-content storage 152 that has a plurality of sponsored media items 154A-N. These sponsored media items 154A-N may include text-based advertisements, (e.g., a slogan or trademark), a still image (e.g. a logo or print-style advertisement), and/or video advertisements. The media items 154A may also include sound such as dialog, music, or other sound effects presented along with visual content. Users of the sponsored-content server 150 may upload sponsored media items 154A-N for inclusion in a looping media item with one or more of the media items 144A-N of the content-sharing platform 140.

The sponsored-content server 150 may include a sponsored-content configuration subsystem 156. The configuration subsystem 156 may provide a user interface, such as a graphical user interface, to facilitate the selection of sponsored media items and media items 144A-N for combination in looping media items. By including a sponsored media item 154A with media items 144A, an advertisement may be presented to a user of the client 110A in the media viewer 112 in connection with the presentation of the media item 144A. Some examples of such looping media items are illustrated in FIGS. 2A, 2B, and 2C.

Figure 2A:
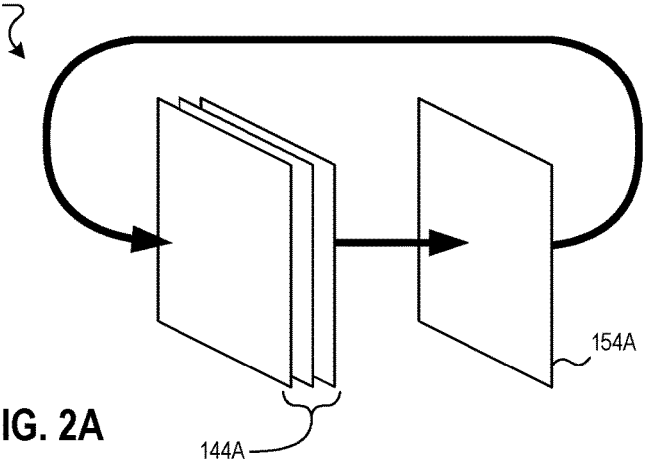
FIGS. 2A, 2B, and 2C illustrate various integrations of a secondary media item into a looped media item, according to embodiments of the disclosure.

Referring to FIG. 2A, shown therein is the media item 144A and the sponsored media item 154A. In this example, the media item 144A is a video item that includes a plurality of video frames and the sponsored media item 154A is a still image that includes a logo of the sponsor of the media item 154A. These two media items 144A and 154A are combined in a combined looping media item 200. When the looping media item 200 is played by the media viewer 112 of client device 110A, the media item 144A is played until its end, at which point the sponsored media item 154A is played. Playing the sponsored media item 154A may be displaying it for a predetermined amount of time; for example, 5 seconds. After the sponsored media item 154A is thus played, the media item 144A is again played from its beginning to end. Again, the sponsored media item 154A is played, etc. In this way the looping media item 200 causes both the media item 144A and the sponsored media item 154A to be played to a user of the content-sharing platform 140 in a continuous loop.

Figure 2B:
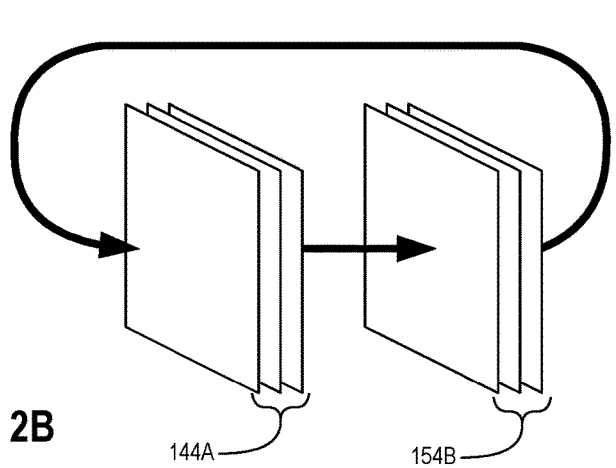

FIG. 2B illustrates the media item 144A included in a looping media item 210 with a sponsored media item 154B. As shown in FIG. 2B, the sponsored media item 154B is a video including a plurality of frames. When the looping media item 210 is displayed, first the media item 144A is played in its entirety, then the sponsored media item 154B is played in its entirety, then the media item 144A is played again, etc., in a continuous loop.

Figure 2C:
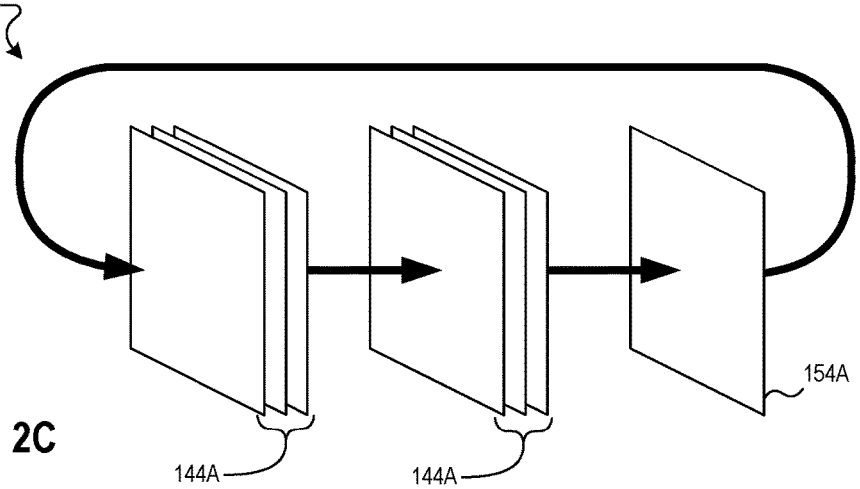

FIG. 2C illustrates a looping media item 220 that includes the media item 144A and the sponsored media item 154A. As shown in FIG. 2C, playing the looping media item 220 includes playing the media item 144A, playing the media item 144A again, and then playing the sponsored media item 154A for a predetermined amount of time in embodiments in which the sponsored media item 154A is text or a still image.

While illustrated as a single loop, the looping media item 220 may be understood as having an inner loop that specifies a loop count for the media item 144A (shown as a loop count of two) and an outer loop that incorporates the sponsored media item 154A into the media item 220. In embodiments of the looping media item 220, the media item 144A may be played once or many times. For example, the looping media item 220 may play the media item 144A five, ten, twenty, or more times before playing the sponsored media item 154A. Thus, loop counts of five, ten, twenty, or more may be used in the playing of the media item 144A, rather than the illustrated loop count of two. Many other combinations and variations of the looping media items 200, 210, and 220 are within the scope of this disclosure. In some embodiments, more than one sponsored media item may be combined with the media item 144A in a single looping media item. In some embodiments, there may be more than one loop count. For example, a media item 144A may loop a number of times equal to a first loop count (e.g, 0, 1, 5, 10, etc.), after which the sponsored media item 154A may play. Then a different loop count may be used to play the media item 144A. In some embodiments, the sponsored media item 154A may be played once or another limited number of times, after which only the media item 144A loops alone.

Returning to FIG. 1, a sponsor of the sponsored media item 154A may use the sponsored-content configuration subsystem 156 to identify one or more of the media items 144A-N and determine using a user interface, how the sponsored media item 154A is to be presented in connection with the identified media item or items. Associated data may then be communicated from the sponsored-content server 150 to the content-sharing platform 140 and the sponsored-content incorporation subsystem 149 operating thereon. This information may be used by the media providing subsystem 148 when it communicates with client devices 110A-N in providing the media items 144A-N. The information may be used to include the sponsored media item 154A in the presentation of one or more of the media items 144A-N. This may be done by including a link to the sponsored media item 154A and a link to the media item 144A in a file sent to the client devices 110A-N in response to receiving a request for the media item 144A. The file may further include instructions to the media viewer 112 to control how the combined looping media item is to be played. For example, the instructions may include a loop count such that the media item 144A is played a number of times equal to the loop count before the sponsored media item 154A is played, as seen in FIG. 2C. The links and instructions may be included as data or metadata in a manifest file sent to the client devices 110A in response to a request for the media item 144A. In some embodiments, the sponsored media item 154A may be stored in a cache of the client device 110A for offline playing when the client device 110A is offline. The cache may store a plurality of sponsored media items for such offline playing.

Figure 3:
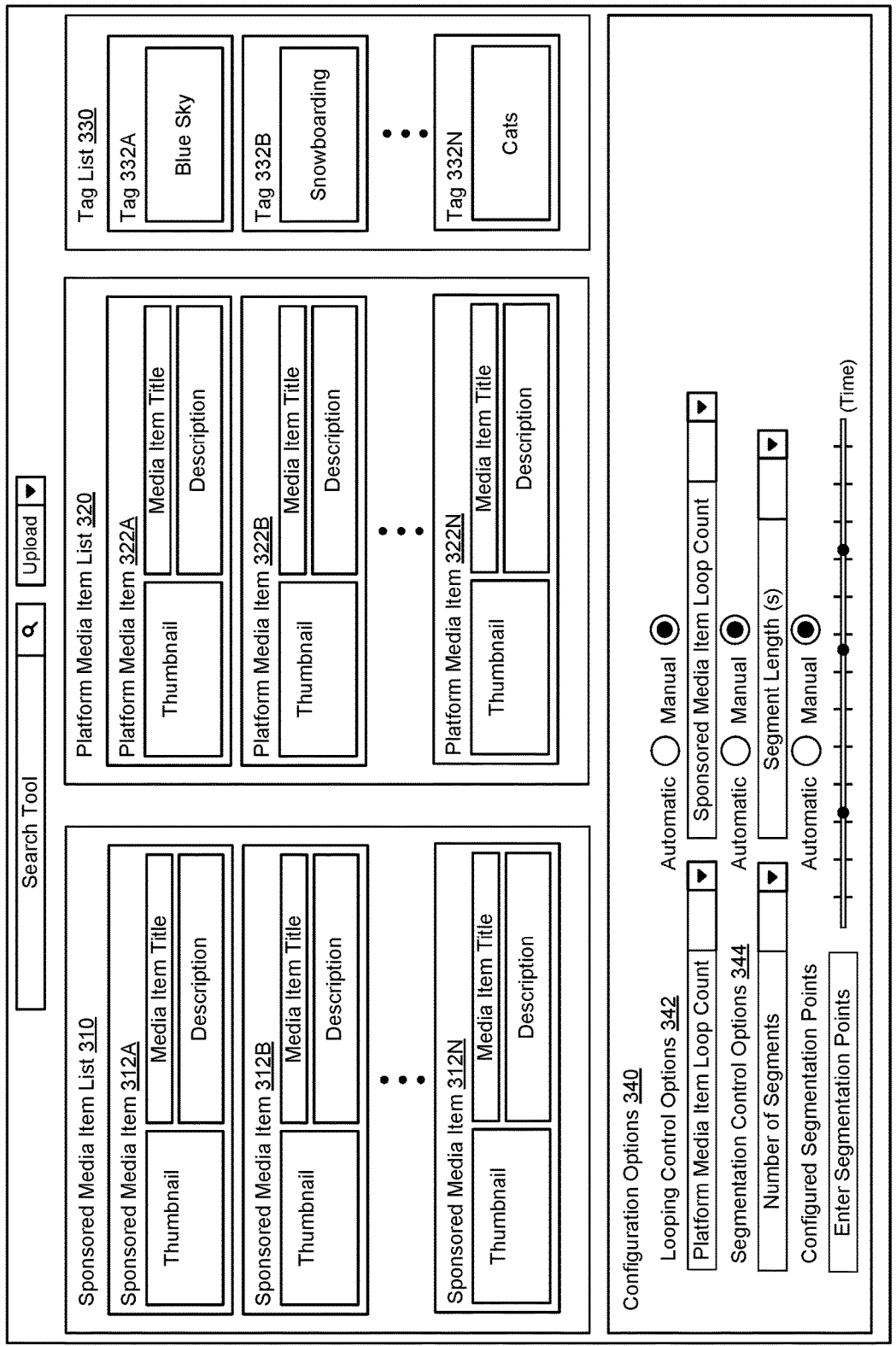
FIG. 3 illustrates an exemplary user interface for combining a secondary media item with a primary media item in a looping media item, in accordance with some embodiments of the disclosure.

As described herein, a user interface may be presented to a content sponsor to facilitate the combination of a sponsored media item or items with a media item or items into one or more looping media items. An exemplary user interface 300 is illustrated in FIG. 3. FIG. 3 illustrates a graphical user interface, but other interfaces may be employed in some embodiments. The user interface 300 permits content providers to upload sponsored media items which are then displayed in a sponsored media item list 310. The sponsored media item list 310 may include a plurality of sponsored media items previously uploaded by the content sponsor. As illustrated, the sponsored media item list 310 includes sponsored media items 312A, 312B, and 312N. Each of the sponsored media items 312A-N may include information to facilitate the content sponsor in selecting a sponsored media item for inclusion with a media item or items from the content-sharing platform.

Thus, the user interface 300 includes a platform media item list 320 that provides information on platform media items 322A-N. The sponsored media items 312A-N and the platform media items 322A-N are illustrated as including a plurality of informational fields. As illustrated, the fields contain a thumbnail, a title, and a description of the media item. Some embodiments may provide for more information or less information, but the provided information may permit the content sponsor to select an appropriate platform media item to combine with a sponsored media item in a looping media item. In some embodiments, the platform media items 322A-N may be played by the content sponsor by clicking or otherwise selecting a thumbnail associated with the media item. In this may a content sponsor may preview a platform media item prior to selecting it.

The user interface also includes a tag list 330 with a plurality of tags 332A, 332B, and 332N. As described elsewhere herein, a tag or tags may be selected or entered by users of the content-sharing platform 140 when they upload media items to the platform. The tags may also be automatically generated by the content-sharing platform 140 upon uploading to facilitate search and discovery. The content sponsor may also use the tags 332A-N in the tag list 330 to select media items from the content-sharing platform 140. In some embodiments, the tag list 330 may be used as a way to filter the platform media items 332A-N in the platform media item list 320. For example, when tag 332B is selected by the content sponsor, an outdoor clothing company, the platform media item list 320 is populated with media items 322A-N that are tagged with "snowboarding." The content sponsor may then individually select one or more of the platform media items 322A-N, each having some relation to snowboarding. Alternatively, the content sponsor may simply select the tag 322B without further specifying individual platform media items. This may permit the inclusion of a sponsored media item 312A into a looping media item including any of the tagged media items.

When at least one sponsored media item is selected from the sponsored media item list 310 and at least one platform media item is selected from the platform media item list 320, the content sponsor may use configuration options 340 to configure how the two media items are to be displayed in a combined looping media item to users of the content-sharing platform 140. Some control options are expressly included in the configuration options 340, but other may be used in other embodiments. As illustrated, the configuration options 340 include a looping control option 342. The looping control options 342 may permit the selection of an automatic setting or of manual settings. When the manual settings are selected, the content sponsor may select or enter a loop count for the selected platform media item or items. For example, the content sponsor may use the looping control options 342 to direct that the platform media item play five times before playing the sponsored media item. In such an example, the loop count would be set equal to five. The content sponsor may also direct that the sponsored media item be played in a loop. For example, the sponsored media item may be a video to be looped four times. Thus, the overall looping media item would play the platform media item five times, then play the sponsored media item four times, then play the platform media item five times again, etc.

The configuration options 340 may also include a segmentation control options 344. The segmentation control options may be used when the sponsored media item has a duration that is significantly greater than a duration of the platform media item. For example, the platform media item may be a 6-second video, while the sponsored media item is a 10-second video. The segmentation control options 344 may permit the content sponsor to break up or segment the sponsored media item such that no segment is larger than the platform media item. After the platform media item plays for a loop count, a first portion or segment of the sponsored media item is played. The platform media item plays again for the loop count, then a second portion of the sponsored media item is played. The segmentation control options 344 may permit the content sponsor to select a number of segments and/or the length of segments for the sponsored media item. The segmentation control options may also permit the content sponsor to manually select segmentation points using a timeline representing the duration of the sponsored content item.

These and other configuration options may be provided to content sponsors. The selections made by the content sponsors may be provided to the content-sharing platform 140 through the sponsored-content incorporation subsystem 149. These configuration options may be provided to the content sharing platform 140 when they are specified by content sponsors. Alternatively, the configuration options may be provided to the content-sharing platform 140 when a certain primary media item is requested by a client device 110A. In one example, responsive to such a request, the content-sharing platform 140 can request one or more sponsored media items that match characteristics (e.g., tags) of the requested primary media item. When there are multiple matching sponsored media items, they can be auctioned to determine what sponsored media item should be combined with the requested primary media item. This determination may depend on, for example, other sponsors' bids (e.g., the maximum amount a sponsor will pay per user click on a sponsored media item) and/or the performance scores of the sponsored media items. The performance score of a sponsored media item such as an ad may be calculated based on, for example, historical click-through rates, relevance of an advertiser's ad text and keywords, an advertiser's account history, etc. Alternatively, the sponsored media item may be selected on a reservation basis (e.g., based on predefined conditions) without taking into account other sponsors' bids and/or the performance scores of the sponsored media items.

The content-sharing platform 140 may include configuration options pertaining to the sponsored media item as data or metadata in a file sent to the client devices 110A when they request a respective primary media item. For example, a manifest file may be sent by the media providing subsystem 148 in response to a request from the client device 110A to play the media item 144A in the media view 112. The media providing subsystem 148 may receive information from the sponsored-content incorporation subsystem 149 that causes the media item 144A to be associated with a sponsored media item 154A. The information may include a link or uniform resource identifier (URI) to the sponsored media item 154A and further specify configuration options, e.g. loop counts and/or segmentation information to be used by the media viewer 112 in playing both the media item 144A and the sponsored media item 154A in a looping media item. In some embodiments, the media providing subsystem 148 may send a uniform resource locator (URL) to the client device 110A by which the client device 110A and the media viewer 112 may access the manifest file.

In some embodiments, the system architecture 100 may permit the users of the content-sharing platform 140 with additional options for interacting with other users and sharing content in new ways. This may be done by incorporating additional user-generated content into a looping media item produced from a first user-generated media item. Referring again to FIGS. 2A-C, the media item 144A therein may be a video uploaded by a first user. The sponsored content 154A may be another user-generated media item, rather than an advertisement. For example the media item 144A may be a video uploaded by a first user showing a snowboarding trick. The media item 154A may be a text-based comment from another user of the content-sharing platform. In some content-sharing platforms, user-comments on a media item may be rated or approved of by the other users of the platform. A top comment or a number of top comments may be displayed as the media item 154A in a looping media item, such that the media item 154A may point to a first comment at a first time and to a second comment at a second time after the first, when the second comment becomes the top comment. A top comment or a most recent comment may be shown in a video frame used by the media viewer 112 for the playing of the media item 144A.

Thus, rather than simply showing the media item 144A, a looping media item may play the media item 144A and a comment. As described above, the content-sharing platform 140 may configure the looping media item to present the media item 144A a number of times equal to a loop count before showing the comment (media item 154A), after which the media item 144A is played again. In some embodiments, a user may upload a video as the media item 154B of FIG. 2B that may be played with the media item 144A in a looping media item. The video may be responsive to the content included in the media item 144A. In some embodiments, this combined looping media item may become a new media item stored in the media item storage 142.

Thus, the system architecture 100 provides a system whereby a sponsored media item may be included in the presentation of a user-generated media item in a looping media item. This may provide a source of revenue for both the content-sharing platform and for the users who generate media items to share on the platform. It may permit content sponsors to reach a new audience in this new medium of looping media items. Additionally, the system architecture 100 may also permit users of the content-sharing platform to interact with and respond to user-generated content in additional engaging ways.

In some embodiments, when a user of the content-sharing platform 140 uploads a media item into the media item storage 142, the user may be presented with an option to permit a secondary media item to be associated with their uploaded media item as described herein or to prevent such associations. The options may be presented in advance in settings associated with the user's account. In some related embodiments, the user may be able to specify that only specific types of secondary media items may be associated with their uploaded media item. For example, a user may upload a video and indicate, through a user interface, that secondary media items such as comments and responsive media items by viewers of the video may be permitted, but that advertisements are not. As another example, a user may upload a video and specify that secondary media items that are comments are not to be associated with the uploaded video while advertisements may be. The content-sharing platform 140 may provide default settings with regard to the types of secondary media items that permit all types of secondary media items to be associated with uploaded media items, while providing for the opting out of any or all types of secondary media items as described herein.

In situations in which the systems discussed here collect personal information about users, or may make use of personal information, the users may be provided with an opportunity to control whether the content-sharing platform 140 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content-sharing platform 140.

FIG. 4A is a flow diagram illustrating a method 400 for displaying additional content between the loops of a looping media item. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 400 and other methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any non-transitory, tangible computer-readable device or storage media. In one embodiment, method 400 may be performed by the content-sharing platform 140 and subsystems thereof as shown in FIG. 1.

Embodiments of the method 400 may begin at block 402 when a request for a primary media item is received by processing logic. The request may be a request for the media items 144A in the media item storage 142. The media item 144A may include text, a still image or images, and/or a video. The media item storage 142 is provided by the content-sharing platform 140. A user may access the content-sharing platform 140 with a client device 110A. At block 404, processing logic determines that the requested primary media is a looping media item. This may be done by checking a database for properties of the media item 144A. Additionally, the content-sharing platform 140 may be a platform for sharing looping media items or may sort and store looping media items separately from non-looping media items. Thus, information regarding the platform 140 itself may be used to determine that the media item 144A is a looping media item.

At block 406, the processing logic identifies a secondary media item for the primary media item. For example, the sponsored-content incorporation subsystem 149 may receive, from the sponsored-content server, information that indicates that a sponsored media item 154A should be displayed in a looping media item with the media item 144A. A content sponsor may configure the looping media item using a user interface, like the user interface 300 of FIG. 3. At block 408, the processing logic provides the primary media item and the secondary media item. The secondary media item is provided for presentation between loops of the primary media item. This may be done by creating a file and sending the file or a link to the file to the client device 110A. The file includes an identifier of the media item 144A and the sponsored media item 154A along with instructions for how the media items 144A and 154A are to be played by the media viewer 112. The instructions may include a loop count such that the media item 144A is played a number of times equal to the loop count before the sponsored media item 154A is played. After the sponsored media item 154A is played, the instructions direct the media item 144A to play the media item 144A the number of times again, etc., in a loop displayed to the user of the client device 110A. In some embodiments, the instructions may include a loop count for the secondary media item, or may direct the secondary media item to be played in segments. After a media item has been played the number of times equal to its loop count, the loop count is reset in preparation for another loop of the combined looping media item.

When the secondary media item is to be played in segments, the file including instructions sent to the client device 110A from the content-sharing platform 140 may include multiple links to the secondary media item, one link to each portion. The links may be to separate files, each including the portion of the secondary media item. Alternatively, the file may include a reference to several points within a single media item file.

In some embodiments, the client device 110A is a mobile device having an application (mobile app) running thereon. As the user of the client device 110A scrolls through a feed in the application, a frame for a media item may appear (e.g., in an embedded media player). The media item may play automatically once its frame (e.g., a thumbnail image used to demarcate a portion of the feed in which the media item may be played) is fully or partially (but above a threshold) displayed in a screen of the client device 110A. Thus, the client device 110A may request the media item when its frame is visible to the user in the feed of the application. The requested media item is played in a looping media item that includes the sponsored media item.

In some embodiments, the sponsored media item is another user-generated media item. In such embodiments, the secondary media item may include user-generated text as a comment or a video or image that provides a visual comment on, or responsive to, the primary media item.

Referring now to FIG. 5, a flow diagram is shown therein that illustrates a method 500 for displaying content between loops of a looping media item. The method 500 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 500 may be performed by the sponsored-content server 150 as shown in FIG. 1.

Embodiments of the method 500 may begin at block 502 in which processing logic receives a secondary item for insertion into a looping media item with one or primary media items. The secondary media item may be uploaded as a sponsored media item using an interface like the user interface 300 of FIG. 3. The secondary media item may be shown to a user of the user interface 300 in a sponsored media item list 310, where it may be selected by the user. At block 504, the processing logic receives information identifying the one or more primary media items. The sponsored-content server 150 may receive information from the content-sharing platform 140 that describes the media items 144A-N and that may provide access to the media items 144A-N from within the user interface 300. For example, the media items 144A-N may be provided in the platform media item list 320 in the user interface 300. The information may include thumbnails, descriptions, titles, tags, and links associated with the platform media items 322A-N. The content sponsor may use the information to select one or more of the media items 322A-N with which to associate one of the sponsored media items 312A-N that belongs to the content sponsor.

At block 506, the processing logic associates the secondary media item with the information identifying the one or more primary media items. This may be done by associating a link to the secondary media item with a link to each of the one or more primary media items or by associated the secondary media item with one or more tags that identify the one or more primary media items. For example, the user of the user interface 300 may select one or more of the platform media items 322A-N individually or by selecting one or more of the tags 332A-N in the tag list 330. One or more files may be produced by the sponsored-content server 150, or by the content-sharing platform 140, using information from the sponsored-content server 150, that contain a link to or an identifier of the sponsored media item 312A and links or identifiers of the associated one or more of the platform media items 322A-N.

At block 508, the processing logic provides the secondary media item for play with at least one of the primary media items. When a client device 110A requests the primary media item, a link to the primary media item may be provided to the client device 110A along with a link to the secondary media item. After the primary media item is played, the secondary media item may be played by requesting the secondary media item from the sponsored-content server 150 or from data store 130. For example, a manifest file may be received from the content-sharing platform 140 that includes a link to the sponsored media item 154A. After the media item 144A is played by the client device 110A in the media viewer 112, the media viewer 112 requests the sponsored media item 154A from the sponsored-content server 150, from which the media item 154A may be streamed. The media item 154A may be saved in a cache or other memory of the client device 110A until it is to be played again according to instructions received in response to the request for the media item 144A.

FIGS. 6A and 6B are flow diagrams illustrating methods 600 and 610, respectively, for providing a secondary media item for a primary media item. The methods 600 and 610 may be performed by processing logic that comprises hardware (e.g., circuitry, dedicated logic, programmable logic, microcode, etc.), software (e.g., instructions run on a processing device to perform hardware simulation), or a combination thereof. In one embodiment, methods 600 and 610 may be performed by the sponsored-content server 150 as shown in FIG. 1.

The method 600 may begin in block 602 in which processing logic provides a user interface for selection of at least one primary media item from a plurality of media items. For example, the user interface 300 of FIG. 3 may be provided by the processing logic. As seen in FIG. 3, the user interface includes a platform media item list 322 that includes a plurality of platform media item 322A-N. At block 604, a thumbnail of each of the plurality of media items is displayed by the processing logic. As seen in FIG. 3, the thumbnails may provide a content sponsor with the ability to see the platform media items to which the content sponsor may want to associate one or more sponsored media items.

At block 606, the processing logic receives a user selection of at least one primary media item. For example, the content sponsor may view the thumbnail for the platform media item 322A and select it as part of a request to form a looping media item that includes both the platform media item 322A and the sponsored media item 312A. At block 608, a link to the primary media item is stored by the processing logic with a link to the secondary media item. This information may be provided to the content sharing platform 140 in advance or in real-time when one of client devices 110A-N issues a request for the platform media item 322A. The information may be stored in other lists and databases that preserve the association between the platform media item 322A and the sponsored media item 312A.

FIG. 6B is a flow diagram of the method 610 and may share some features with the method 600 of FIG. 6A. Embodiments of the method 610 may begin at block 612 in which processing logic provides a user interface for selection of at least one primary media item of a plurality of media items. This may be similar to the block 602 of method 600 as described herein. At block 614, the processing logic displays plurality of tags for a plurality of primary media items for selection by a content provider or by a user of the content-sharing platform 140. The tags may be displayed in a tag list like the tag list 330 of FIG. 3.

At block 616, the processing logic receives a user selection of at least one tag of the plurality of tags. For example, the user interface 300 may permit a content provider to select the tag 322A, a "blue sky" tag that is associated with platform media items that depict a blue sky. The tags may be entered manually by users when uploading media items to the content-sharing platform 140 or by a computer-tagging subsystem of the content-sharing platform 140. At block 618, the processing logic stores a link to the secondary media item with a link or links to primary media items corresponding to the tag. For example, when platform media items 322A and 332B have been tagged with the "blue sky" tag, the content provider's selection of the tag 332A may identify both the platform media items 322A and 322B. Links to these two items may be stored together with a link the sponsored media item 312A by the sponsored-content server 150, or information indicating the association may be sent to the content-sharing platform 140.

Referring now to FIG. 7, shown there is a flow diagram of a method 700 for viewing a secondary media item in a loop with a primary media item. The method 700 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 700 may be performed by the client device 110A having the media viewer 112 as shown in FIG. 1.

Embodiments of the method 700 may begin at block 702 in which a request is received for a primary media item. The request may be received by a user's interactions with the media viewer 112. For example, the user may click a link being displayed in the media viewer 112 or the user may scroll through a feed, such as a feed from a content-sharing platform. In some embodiments, when a user scrolls through the feed and thereby exposes a frame in which a media item is to be played, as directed by the content-sharing platform, the exposure may trigger a request for the primary media item that is received by the client device 110A. The client device 110A may send the request to the content-sharing platform 140.

At block 704, the processing logic receives instructions to loop the primary media item and to present a secondary media item in between loops of the primary media item. For example, the client device 110A may receive a manifest file from the content-sharing platform that includes a link to the primary media item and a link to the secondary media item. These links may be web URLs. The manifest file may include further instructions that specify how the media viewer 112 should process the files linked in the file in order to loop them. For example, the instructions may include a direction to play the primary media item ten times before playing the secondary media item once, and to then again play the primary media item ten times, etc. The instructions may indicate a play time for the secondary media item in embodiments in which the secondary media item includes text or still images. Further instructions may be provided in the manifest file as described herein. Alternatively, the instructions may be accessed by following a link to the instruction provided in the manifest file.

At block 706, the processing logic plays the primary media item. This may be performed when the client device 110A renders data accessed over the network 120 to a display associated with the client device 110A. The primary media item may play in its entirety and may play multiple times according to the received instructions. At block 708, when playing the primary media item is completed, the processing logic presents the secondary media item followed by another playing of the primary media item. Thus, the processing logic plays the primary media item and the secondary media item together as a combined looping media item. In some embodiments, the secondary media item may be stored in an offline secondary media item cache present on the client device 110A to facilitate the playing of the secondary media item or items even when the client device 110A becomes disconnected from network-access. The combined looping media item may be like the looping media items 200, 210, or 220 of FIGS. 2A, 2B, and 2C, respectively. Other configurations described herein may also be provided to display the primary media item and the secondary media item in connection as a looping media item.

Figure 8:
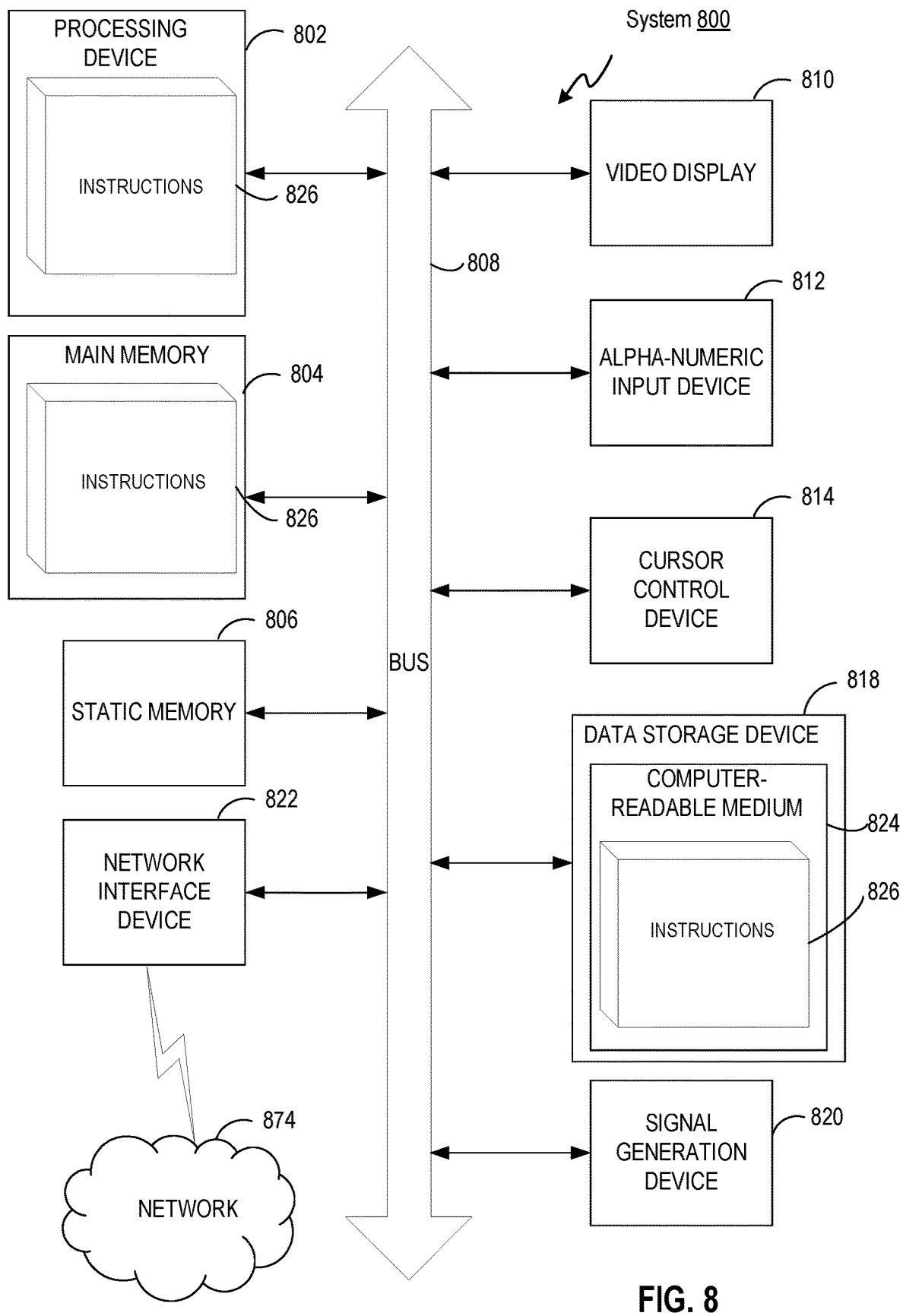
FIG. 8 is a block diagram illustrating an exemplary system architecture, according to some embodiments.

FIG. 8 illustrates a diagrammatic representation of a machine in the exemplary form of a computer system 800 within which a set of instructions or sets of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808.

Processor 802 represents one or more general-purpose processing devices such as a microprocessor, central processing unit, or the like, having one or more cores. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein. For example, the processing 802 may execute instructions 826 to perform methods 400, 500, 510, 600, and/or 700 as shown herein in FIGS. 4, 5A, 5B, 6, and 7.

The computer system 800 may further include a network interface device 822. The computer system 800 also may include a video display unit 810 (e.g., a liquid crystal display (LCD), a cathode ray tube (CRT), or a touch screen), an alphanumeric input device 812 (e.g., a physical keyboard or a virtual keyboard), a cursor control device 814 (e.g., a mouse), and a signal generation device 820 (e.g., a speaker).

The data storage device 818 may include a non-transitory computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 874 via the network interface device 822.

In one embodiment, the instructions 826 include instructions for a media providing subsystem, a sponsored-content incorporation subsystem, a sponsored-content configuration subsystem, a media viewer or other features which may correspond, respectively, to identically-named counterparts described with respect to FIG. 1, and/or a software library containing methods for displaying content in between loops of a looping media item. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "analyzing", "determining", "receiving", "identifying", "generating", "playing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving a request for a primary media item comprising a plurality of frames;
determining that the requested primary media item is a looping video that is intended to be played repeatedly without a repetition request from a user;
identifying, by a processing device, a secondary media item for the primary media item; and
providing the primary media item and the secondary media item, wherein the secondary media item is to be presented after a playback of the primary media item, and the playback of the primary media item is to be repeated after a presentation of the secondary media item and without the repetition request from the user, wherein the playback of the primary media item presents the plurality of frames in a successive order such that a single frame of the plurality of frames is presented alone at a particular instance in time during the playback.

2. The method of claim 1, wherein the secondary media item comprises at least one of text, an image, or a video.

3. The method of claim 1, wherein providing the primary media item and the secondary media item comprises providing instructions to a user device of the user, the instructions comprising a primary media item loop count directing the primary media item to play a number of times equal to the loop count after presenting the secondary media item.

4. The method of claim 1, wherein the secondary media item or a portion of the second media item is presented before the playback of the primary media item is repeated without the repetition request from the user.

5. The method of claim 1, further comprising providing instructions to a user device of the user, the instructions comprising a primary media item loop count directing the primary media item to play a number of times equal to the loop count before presenting the secondary media item.

6. The method of claim 1, further comprising causing the secondary media item to be separated into a first secondary media item portion and a second secondary media item portion; and wherein providing the primary media item and the secondary media item comprises sending instructions to:
play the first secondary media item portion after repeating the playback of the primary media item a first number of times; and
play the second secondary media item portion after the primary media item is played a second number of times.

7. The method of claim 6, wherein the first number of times and the second number of times correspond to a same loop count or different loop counts.

8. The method of claim 1, wherein determining that the requested primary media item is a looping media item comprises receiving the request from an application that plays looping media items.

9. A non-transitory computer-readable storage medium storing instructions which, when executed, cause a processing device to perform operations comprising:
receiving a request for a primary media item comprising a plurality of frames;
determining that the requested primary media item is a looping video that is intended to be played repeatedly without a repetition request from a user;
identifying a secondary media item for the primary media item; and
providing the primary media item and the secondary media item, wherein the secondary media item is to be presented after a playback of the primary media item, and the playback of the primary media item is to be repeated after a presentation of the secondary media item and without the repetition request from the user, wherein the playback of the primary media item presents the plurality of frames in a successive order such that a single frame of the plurality of frames is presented alone at a particular instance in time during the playback.

10. The non-transitory computer-readable storage medium of claim 9, wherein providing the primary media item and the secondary media item comprises providing instructions to a user device of the user, the instructions comprising a primary media item loop count directing the primary media item to play a number of times equal to the loop count after presenting the secondary media item.

11. The non-transitory computer-readable storage medium of claim 9, wherein the secondary media item or a portion of the second media item is presented before the playback of the primary media item is repeated without the repetition request from the user.

12. The non-transitory computer-readable storage medium of claim 9, providing the primary media item and the secondary media item comprises providing instructions to a user device of the user, the instructions comprising a primary media item loop count directing the primary media item to play a number of times equal to the loop count before presenting the secondary media item.

13. The non-transitory computer-readable storage medium of claim 9, further comprising causing the secondary media item to be separated into a first secondary media item portion and a second secondary media item portion; and wherein providing the primary media item and the secondary media item comprises sending instructions to:
   play the first secondary media item portion after repeating the playback of the primary media item a first number of times; and
   play the second secondary media item portion after the primary media item is played a second number of times.

14. The non-transitory computer-readable storage medium of claim 13, wherein the first number of times and the second number of times correspond to a same loop count or different loop counts.

15. A system comprising:
   a memory to store instructions; and
   a processing device communicably coupled to the memory, the processing device to:
   receive a request for a primary media item comprising a plurality of frames;
   determine that the requested primary media item is a looping video that is intended to be played repeatedly without a repetition request from a user;
   identify a secondary media item for the primary media item; and
   provide the primary media item and the secondary media item, wherein the secondary media item is to be presented after a playback of the primary media item, and the playback of the primary media item is to be repeated after a presentation of the secondary media item and without the repetition request from the user, wherein the playback of the primary media item presents the plurality of frames in a successive order such that a single frame of the plurality of frames is presented alone at a particular instance in time during the playback.

16. The system of claim 15, wherein to provide the primary media item and the secondary media item, the processing device is to provide instructions to a user device of the user, the instructions comprising a primary media item loop count directing the primary media item to play a number of times equal to the loop count after presenting the secondary media item.

17. The system of claim 15, wherein the secondary media item or a portion of the second media item is presented before the playback of the primary media item is repeated without the repetition request from the user.

18. The system of claim 15, wherein to provide the primary media item and the secondary media item, the processing device is to provide instructions to a user device of the user, the instructions comprising a primary media item loop count directing the primary media item to play a number of times equal to the loop count before presenting the secondary media item.

19. The system of claim 15, wherein the processing device is further to cause the secondary media item to be separated into a first secondary media item portion and a second secondary media item portion, and wherein to provide the primary media item and the secondary media item, the processing device is to:
   play the first secondary media item portion after repeating the playback of the primary media item a first number of times; and
   play the second secondary media item portion after the primary media item is played a second number of times.

20. The system of claim 19, wherein the first number of times and the second number of times correspond to a same loop count or different loop counts.

21. A method comprising:
   receiving a request for a primary media item that is a looping video intended to be played repeatedly without a repetition request from a user, wherein the primary media item comprises a plurality of frames;
   receiving instructions to play the primary media item repeatedly, without the repetition request from the user, and to present a secondary media item in between repetitions of the primary media item;
   playing, by a processing device, the primary media item by presenting the plurality of frames in a successive order such that a single frame of the plurality of frames is presented alone at a particular instance in time during the playing;
   presenting the secondary media item after a playback of the primary media item is completed; and
   repeating the playback of the primary media item after a presentation of the secondary media item and without the repetition request from the user.

22. The method of claim 21, wherein the instructions comprise a primary media item loop count that defines at least one of a number of times to play the primary media item before presenting the secondary media item, or a number of times to play the primary media item after presenting the secondary media item.

23. The method of claim 21, wherein the secondary media item or a portion of the secondary media item is presented before the playback of the primary media item is repeated without the repetition request from the user.

24. The method of claim 21, wherein the secondary media item is separated into a first secondary media item portion and a second secondary media item portion, and wherein the instructions define a first number of times to repeat the playback of the primary media item before playing the first secondary media item portion, and a second number of times to repeat the playback of the primary media item before playing the second secondary media item portion.

25. The method of claim 24, wherein the first number of times and the second number of times correspond to a same loop count or different loop counts.

* * * * *